United States Patent Office 3,498,985
Patented Mar. 3, 1970

3,498,985
ADDUCTS OF BIS-(2-PYRIDYL - 1-OXIDE) DISULFIDE WITH ALKYL-SUBSTITUTED TIN SALTS
Charles W. Kaufman, Hamden, and Guenter K. Weisse, Northford, Conn., assignors to Olin Mathieson Chemical Corporation, a corporation of Virginia
No Drawing. Filed Mar. 24, 1967, Ser. No. 625,578
Int. Cl. C07f 7/20; A01m 9/22
U.S. Cl. 260—270                    3 Claims

ABSTRACT OF THE DISCLOSURE

Adducts of bis-(2-pyridyl-1-oxide) disulfide are prepared by adding an organo-substituted tin salt, such as dimethyl tin dichloride, in acidified aqueous solution to an approximately equimolar amount of an acidified aqueous solution of the bis-(2-pyridyl-1-oxide) disulfide. The reaction can be conducted utilizing bis-2(pyridyl-1-oxide) disulfide which has been substituted in the pyridine rings other than in the 1 and 2 positions with any innocuous group such as lower alkyl or halo groups.

---

This invention relates to adducts of bis-(2-pyridyl-1-oxide) disulfide with organo-substituted tin salts.

The novel adducts of this invention have the formula:

$$RR'_rR''_sSnX_t \cdot (C_5H_4NOS)_2$$

wherein R, R' and R'' are independently selected from the group consisting of alkyl of from 1 to 10 carbon atoms, r and s are each an independently selected integer of from 0 to 1 inclusive, t is an integer of from 1 to 3 inclusive, the sum of $r+s+t$ is from 1 to 3 inclusive and X is the anion of an inorganic or organic acid.

In the process of this invention the adduct is prepared by adding an organo-substituted tin salt in acidified aqueous solution to an approrpiately equimolar amount of an acidified aqueous solution of the bis-(2-pyridyl-1-oxide) disulfide and recovering the resulting adduct from the reaction mixture. The reaction can be conducted utilizing bis-(2-pyridyl-1-oxide) disulfide which has been substituted in the pyridine rings other than the 1 and 2 positions with any innocuous group such as lower alkyl or halo groups.

Organo-substituted tin salts suitable for use as starting materials of the process of this invention have the formula:

$$RR'_rR''_sSnX_t$$

wherein R, R' and R'' are independently selected from the group consisting of alkyl of from 1 to 10 carbon atoms, r and s are each an independently selected integer from 0 to 1 inclusive, t is an integer of from 1 to 3 inclusive, the sum of $r+s+t$ is from 1 to 3 inclusive, and X is the anion of an inorganic or organic acid. The anions mentioned may be nitrates, acetates, sulfates, halides, etc.

Useful organo-substituted metal salts include, for example, the following materials: methyl tin chloride, ethyl tin chloride, octyl tin chloride, isononyl tin chloride, dimethyl tin dichloride, methyl propyl tin dichloride, hexyl heptyl tin dichloride, di-heptyl tin dichloride, octyl decyl tin dichloride, trimethyl tin chloride, dihexyl octyl tin chloride, tridecyl tin chloride, etc., and the corresponding bromine, fluorine, and iodine compounds as well as the corresponding acetates, nitrates and sulfates of these same materials.

The invention will be more fully understood by reference to the following examples. It is pointed out, however, that the examples are given for the purpose of illustration only and is not to be construed as limiting the scope of the invention in any way.

EXAMPLE I

Dimethyl tin dichloride adduct of bis-(2-pyridyl-1-oxide) disulfide

To 0.05 mole of bis-(2-pyridyl-1-oxide) disulfide dissolved in 100 ml. of concentrated hydrochloric acid there was added 0.05 mole of dimethyl tin dichloride dissolved in 50 ml. of concentrated hydrochloric acid. A total of 300 ml. of water was added and a white solid product precipitated from the reaction mixture. The product, which was recovered by filtration, was the dimethyl tin dichloride adduct of bis-(2-pyridyl-1-oxide) of the empirical formula:

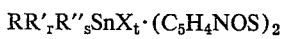

$$(CH_3)_2SnCl_2 \cdot (C_5H_4NOS)_2$$

M.P. 171–3° C. (yield—72 percent of theoretical).

EXAMPLE II

Dibutyl tin dichloride adduct of bis-(2-pyridyl-1-oxide) disulfide

Dibutyl tin dichloride (0.1 mole) and bis-(2-pyridyl-1-oxide) disulfide (0.1 mole) were dissolved in 100 ml. of glacial acetic acid. Next the reaction mixture was heated to 90° C. for 1 hour and then poured into 250 ml. of water yielding a white precipitate which was recovered by filtration. Recrystallization from 200 ml. of methanol gave 0.028 mole of the dibutyl tin dichloride adduct of bis-(2-pyridyl-1-oxide) disulfide, a white crystalline solid, M.P. 99–102° C., having the empirical formula:

$$(C_4H_9)_2SnCl_2 \cdot (C_5H_4NOS)_2$$

The adduct was submitted by analysis and the following results were obtained:

*Analysis.*—Calc'd for $C_{18}H_{26}Cl_2N_2O_2S_2Sn$: C, 35.8%; H, 6.47%; Cl, 12.7%. Found: C, 35.98%, 36.13%; H, 6.36%, 6.29%; Cl, 13.4%, 13.4%.

The compounds of this invention are active bactericides and fungicides as indicated by the following in vitro spectra tabulated in Tables I and II which follow: (data on hexachlorophene being included for comparison).

TABLE I.—ANTIBACTERIAL SPECTRUM

| Organism | M.I.C. µg./ml. | |
|---|---|---|
| | A | B |
| Staphylococcus aureus P209 | 0.094 | 0.06 |
| Bacillus subtilis | 0.047 | |
| Streptococcus faecalis | 0.54 | |
| Klebsiella pneumoniae | 2.4 | 18.7 |
| Pseudomonas aeruginosa | 12.5 | 6.3 |
| Proteus vulgaris | 3.1 | |
| Escherichia coli | 4.7 | |
| Salmonella schottmuelleri | 2.1 | |
| Aerobacter aerogenes | 4.7 | |

A—Dimethyl tin dichloride adduct of bis-(2-pyridyl-1-oxide) of Example I; B—Hexachlorophene.

TABLE II.—ANTIFUNGAL SPECTRUM

| Organism | M.I.C. µg./ml. | |
|---|---|---|
| | A | B |
| Candida albicans | 0.063 | 12.5 |
| Penicillium notatum | 0.125 | |
| Trichophyton mentagrophytes | 0.96 | |
| Aspergillus fumigatus | 0.79 | |
| Aspergillus niger | 0.25 | 6.3 |
| Pullularia pullulans | 0.5 | |

A—The dimethyl tin dichloride adduct of bis-(2-pyridyl-1-oxide) of Example I; B—Hexachlorophene.

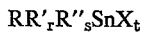

The novel adducts of this invention also find use in controlling various fungi when applied to the substrate. They can be used on leather, paper, skin, varnish, rope, textiles and other substrates on which fungi can thrive. When applied to an uninfected substrate they can prevent infection thereof by many types of fungi. For such applications the adducts can be dispersed on an inert, finelydivided solid and employed as a dust. Suitable solid carriers are clay, talc, bentonite, as well as other carriers known in the art (see Frear, "Chemistry of Insecticides, Fungicides and Herbicides"). Alternately, the adduct may be applied as a spray in a liquid carrier or as a suspension in a nonsolvent. When applied as a suspension it may be desirable to incorporate wetting agents. These adducts may also be admixed with carriers that are themselves active, such as other parasiticides, herbicides and fertilizers. In the protection of fabrics, for example, from mildew or other fungus attack, the adduct may be applied or incorporated in the fabric in a number of ways such as by soaking or spraying it with an aqueous solution of the adduct in hexane. In the protection of paints the adducts of this invention are simply mixed with the paint.

The formula of bis-(2-pyridyl-1-oxide) disulfide, one of the starting materials employed in preparing the adducts of this invention, is shown below:

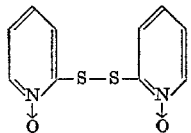

What is claimed is:

1. An adduct of bis-(2-pyridyl-1-oxide) disulfide having the empirical formula:

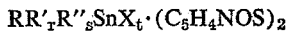

where $(C_5H_4NOS)_2$ represents bis-(2-pyridyl-1-oxide) disulfide and wherein R, R' and R" are independently selected from the group consisting of alkyl of from 1 to 10 carbon atoms, $r$ and $s$ are each an independently selected integer of from 0 to 1 inclusive, $t$ is an integer of from 1 to 3 inclusive, the sum of $r+s+t$ is from 1 to 3 inclusive, and X is the anion of an organic or inorganic acid selected from the group consisting of nitrate, acetate, sulfate and halide anions.

2. The compound of claim 1 wherein $r$ is 1 and $s$ is 0, R and R' are each methyl, X is Cl and $t$ is 2.

3. The compound of claim 1 wherein $r$ is 1 and $s$ is 0, R and R' are each butyl, X is Cl and $t$ is 2.

References Cited

UNITED STATES PATENTS

| | | | |
|---|---|---|---|
| 2,809,971 | 10/1957 | Bernstein et al. | 260—270 |
| 2,867,566 | 1/1959 | Weinberg | 260—270 X |
| 3,027,371 | 3/1962 | Starrs | 260—270 |
| 3,027,372 | 3/1962 | Starrs | 260—270 |
| 3,321,480 | 5/1967 | Schroeder | 260—270 |
| 3,346,578 | 10/1967 | Langlykk et al. | 260—270 |

DONALD G. DAUS, Primary Examiner

U.S. Cl. X.R.

106—316; 252—8.8; 260—429.7; 424—245